Figure 1:
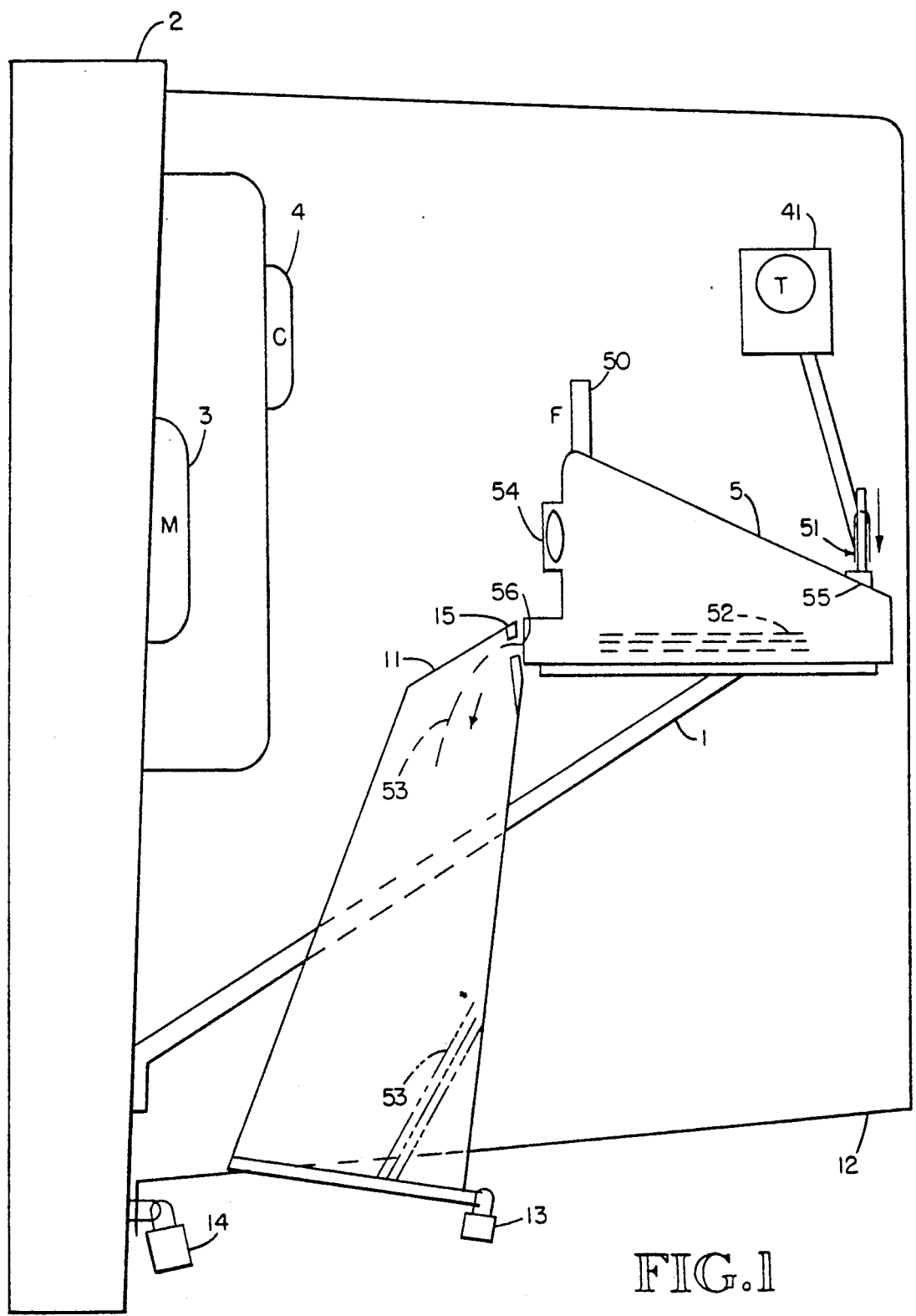

United States Patent [19]

Wyss

[11] Patent Number: 5,016,025
[45] Date of Patent: May 14, 1991

[54] AUTOMATIC SECURED DOCUMENT METER READING APPARATUS

[76] Inventor: John R. Wyss, 4020 148th Ave., NW., Suite F, Redmond, Wash. 98052

[21] Appl. No.: 533,104

[22] Filed: May 25, 1990

[51] Int. Cl.$^5$ .................... G01D 9/42; G03B 29/00; G03B 17/50
[52] U.S. Cl. .................... 346/14 MR; 346/107 MP; 354/76; 354/86
[58] Field of Search .................. 346/107 MP, 14 MR; 354/76, 75, 86

[56] References Cited

U.S. PATENT DOCUMENTS 2,232,829  2/1941  Ross ........................... 346/107 MP
2,426,947  9/1947  Potts ........................... 346/107 MP Primary Examiner—A. A. Mathews
Assistant Examiner—Jae N. Noh

[57] ABSTRACT

A mounting adaptor is provided for use with a standard electric utility meter base, or the like, upon which a typical instant-picture camera is mounted and focused upon a meter to be read. The instant-picture camera is set up with triggerable activation means to automatically produce a photograph of said meter to be read. A timer is in communication with the camera activation means, and at given intervals will trigger the instant-picture camera to photograph the meter to be read, thereby producing a photographic document of the reading, and then automatically deposit the finished document into a security compartment of the mounting adaptor apparatus, after which the document may then be collected at a convenient time by one authorized to access said compartment.

5 Claims, 1 Drawing Sheet

AUTOMATIC SECURED DOCUMENT METER READING APPARATUS

BACKGROUND OF THE INVENTION

In the field of apparatus for photographic recording of metering devices which are used to determine product usage quantities, and particularly the types employed by utility companies which necessitate timely and accurate readings based upon consumer billing intervals, and other types of meters read at regular intervals, a new method of making said reading and dispensing the documentation thereof is provided which is adapted by special mounting and set up to be used with typical meter bases in use at present, which makes the reading and records it upon a finished photographic document which is then automatically stored in a security compartment for its eventual disposition by the product user, or its producer, or the others who would monitor meter readings which are given at predetermined timed intervals.

Prior art shows numerous metering arrangements which utilize photographic means or substances with a nature which shows their extent of exposure to particular electrical or molecular environments, thereby giving a reading regarding such exposure. Other methods of metering use quantitative data to dispense measured amounts of gases, liquids, solids or electricity. Some dispense measured products based upon timed allotments. Some metering devices are available which will expose photographic film at predetermined timed intervals, producing a record of product use through simple photographic means, yet a finished document is not automatically produced and automatically delivered into a secured compartment. Previous apparatus has not been adaptable to typical meter bases in use at present, nor made use of the automatic features of typical inexpensive instant-picture cameras.

SUMMARY OF THE INVENTION

It is therefore an object of this invention to make use of an instant-picture camera to automatically, at predetermined timed intervals, read a meter and to automatically give tangible verification by way of a photographic document of the reading, which is then automatically deposited into a security compartment and available at any convenient time to an authorized user.

It is a further object to provide a meter base mounting adaptor for a typical instant-picture camera for use in timely reading and automatic documentation of typical utility meters in use at present, said adaptor also providing a security compartment for storage of the finished document such that it can be accessed only by authorized persons.

Basic variations to the framework of the mounting adaptor will allow the same apparatus to be used with various types of utility meters. The preferred embodiment is adapted to a typical electric meter base and meter.

For an instant-picture camera, a Polaroid Spectra or Spectra Pro is inexpensive and easily used because of the numerous automatic functions which are already built-in, and the ease of connecting activation means, however, any instant-picture camera may be used in the apparatus.

For the reading, a flash or other lighting means may be required for a clear photographic reproduction of the meter. A time and date clock of some form should also be included in the photograph, to tangibly verify the time at which the reading occurred, thereby documenting timeliness of the reading upon the photograph of the meter as read.

DESCRIPTION OF THE INVENTION

Turn your attention now to FIG. 1. The apparatus comprises a rigid framework, which is the mounting adaptor which connects the assembly to the meter base; a meter base, 2; a meter, 3, to be read; a clock, 4, showing date and time, adjacent to the meter such that it appears in the sight of the camera and thereby in the photograph of the reading; an instant-picture camera, 5, with built-in automatic picture ejection means, mounted on the framework; a flash, 50; a timer, 41, which communicates with activation means of the camera, and flash, and synchronized to the clock; activation means, 51, of the camera and flash; and a security compartment, 11, to receive and store the photograph; instant-picture film, 52, which is to be exposed and thus produces the photographic document from the automatic reading; the photographic document, 53, as secured in the compartment.

If deemed necessary, the entire apparatus can be substantially contained within an enclosure, 12, as protection against vandals or the elements, in a fashion allowing the user to access the security compartment, 11, without removal of the overall enclosure, 12, by exposing an access with locking means, 13, to the outside.

In this embodiment, the camera, 5, which mounts upon the framework, 1, is designed to be mounted upon the meter base, 2, such that the camera lens, 54, is focused from a minimum of 24 inches from the meter, 3. The typically equipped Polaroid Spectra (camera. 5) will not focus from less than this distance. However, other instant-picture cameras and lenses can be used which could reduce the bulk of the framework by permitting the camera to be focused at a distance in closer proximity to the meter to be read. Naturally, the resulting photographic document, 53, in either case must be legible, therefore proper focus of the photographic equipment is necessary.

The timer, 41, is set up to trigger activation means, 51, a solenoid which is in communication with the timer to push the activation button, 55, of the instant-picture camera, 5, at a given interval, which is up to the discretion of the user. If consumption is to be monitored on a monthly basis, and readings are desired showing monthly usage based upon the meter display, the user will set the activation means to be triggered by the timer to produce a photographic reading of the meter at one month intervals, or to trigger said activation means at whatever intervals readings are desired.

Said activation means are any known means of triggering the picture taking action of the instant-picture camera. The Polaroid Spectra and Spectra Pro have built-in electronic activation means which may be triggered and the camera thereby activated simply with a pulse signal across the proper points of the electronic activation circuit already in the cameras, as available at present. Working example shows a solenoid, 51, can activate the camera.

Upon said triggering, an unexposed instant-picture film, 52, is exposed to the face of the meter, 3, and time/date clock, 4, coinciding with aforementioned flash or lighting of the meter and clock, such that a successful photographic representation of the meter reading and time and date thereof is made within the camera upon the film to be exposed, and thenceforth production of the photographic document, 53, is automatically completed by the built-in actions of the instant-picture camera, which will also automatically eject the recently exposed document from an opening, 56, for this purpose at the face of the camera below camera lens, 54, into the security compartment, 11, positioned upon the framework, 1, through an opening, 15, of the security compartment, flush to and coinciding to the opening, 56, from which the exposed film is ejected from the camera, such that the photographic document is then received through the opening, 15, into the security compartment, 11, where the photographic documentation of the reading is then safely stored until its eventual disposition by one authorized to access the secured compartment where the photographic documents are stored.

Since the compartment providing security is only to be accessed by one so authorized, a locking means, 13, is provided which, when unlocked, provides user access to the contents of the compartment.

If deemed necessary, a locking means, 14, may be provided such that the optional overall enclosure is secured so as to provide protection for the apparatus against theft and weather.

Having thus described my invention I claim:

1. Meter reading and documenting apparatus comprising a rigid framework which is the mounting adaptor which connects to the meter base, a meter base, a meter to be read, an instant-picture camera with built-in picture ejection means, activation means of the camera, a timer in communication with activation means of the camera, a security compartment, and instant-picture photographic film which is to be exposed at whatever interval readings are desired, such that said timer triggers, at said given interval, said activation means and upon said triggering unexposed instant-picture film is exposed to the face of the meter such that a successful photographic representation of the meter reading is made within the camera upon the film and thenceforth production of a photographic document is automatically completed by the built-in actions of the instant-picture camera, which also automatically ejects the recently exposed document into the security compartment where the photographic documentation of the reading is then safely stored until its eventual disposition by one authorized to access the secured compartment.

2. The apparatus of claim 1 wherein a camera flash means is included which coincides with said activation means.

3. The apparatus of claim 1 wherein a clock showing date and time appears in the sight of the camera, and thereby in the photograph of the reading.

4. The apparatus of claim wherein the apparatus is substantially contained within an enclosure as protection to the apparatus.

5. The apparatus of claim 4 wherein access is permitted to said security compartment without removal of the overall enclosure by exposing said access to the outside.

* * * * *